United States Patent
Ngai et al.

[19]

[11] Patent Number: 5,806,076
[45] Date of Patent: Sep. 8, 1998

[54] TRACKING DEPENDENCIES BETWEEN TRANSACTIONS IN A DATABASE

[75] Inventors: Gary C. Ngai, Saratoga; Roger J. Bamford, Woodside; Garret Swart, Palo Alto, all of Calif.

[73] Assignee: Oracle Corporation, Redwood Shores, Calif.

[21] Appl. No.: 740,544

[22] Filed: Oct. 29, 1996

[51] Int. Cl.⁶ .................................................. G06F 17/30
[52] U.S. Cl. ............................................ 707/203; 707/206
[58] Field of Search .................................. 707/203, 204, 707/201, 8, 103, 100, 500

[56] References Cited

U.S. PATENT DOCUMENTS 5,559,991  9/1996  Kanfi ....................................... 395/489

*Primary Examiner*—Wayne Amsbury
*Assistant Examiner*—Frantz Coby
*Attorney, Agent, or Firm*—McDermott, Will & Emery

[57] ABSTRACT

A method and an apparatus for tracking of the dependencies between transactions is provided. Every time a data item is updated, a record is made of the transaction that updated the data item. Before another transaction locks a data item previously locked by the transaction, the entry is updated to indicate that the transaction committed and the commit time of the transaction. These entries are contained in a list head that is maintained on the same block as the data item, and a list tail that is stored separate from the data block that contains the data item. A depends-on time is maintained for each transaction. Whenever the transaction updates a data item, the depends-on time is set to the greater of the current depends-on time and the commit time of the most recently committed transaction that updated the version of the data item. Whether a transaction depends on a committed transaction is then determined based on a simple comparison between the depends-on time associated with the transaction and the commit time of the committed transaction.

17 Claims, 3 Drawing Sheets

TRACKING DEPENDENCIES BETWEEN TRANSACTIONS IN A DATABASE

FIELD OF THE INVENTION

The present invention relates to a method and apparatus for accessing stored data, and more specifically, to a method and apparatus for determining dependencies between transactions in a database system.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. When a database system executes a transaction, the transaction may read or update a data item that was written or updated in response to the execution of previous transactions. Consequently, the results returned by the database system in response to executing any given transaction are typically dictated by changes made by a set of previously executed transactions.

If the results returned by a transaction are affected by any change made by a previously executed transaction, then the transaction is said to "depend" on the previously executed transaction. More specifically, a transaction is said to depend on another, previously committed transaction if (1) the previously committed transaction updated a data item that is also updated by the transaction, or (2) the previously committed transaction updated a version of a data item that is supplied to the transaction. The set of all transactions on which a transaction depends is referred to as the "dependency set" of the transaction.

For various reasons, it is important for the database system to keep track of the dependency set of transactions. For example, assume that two transactions, TXA and TXB, must be reapplied. If TXA depends on TXB, then TXB must be reapplied before TXA is reapplied. Conversely, TXA must be reapplied before TXB if TXB depends on TXA. On the other hand, if there is no dependency relationship between TXA and TXB, then TXA and TXB can be reapplied in parallel.

The dependency set of transactions may also determine when caches must be updated. For example, assume that a version of a particular data item DATA1 is stored in a cache. Assume that after DATA1 is loaded into cache, a transaction TXA updates a copy of DATA1 that is on the disk or in a remote cache, and then commits. Another transaction TXB then requires DATA1 to be read.

Under these circumstances, it is more efficient to supply TXB with the version of DATA1 that is already in the cache, rather than load the new version of DATA1 into cache. If TXB does not depend on TXA, then TXB can be supplied the version of DATA1 that is already in the cache. However, if TXB depends on TXA, then TXB has already seen changes made by TXA. For TXB to see a consistent state of the database, the TXB must see all changes made by TXA if TXB sees any of the changes made by TXA. Therefore, if TXB depends on TXA, the newer version of DATA1 must be loaded into the cache and supplied to TXB.

One technique for tracking dependencies between transactions would be to maintain for every version of every data item an INCLUDED list, and for every transaction a DEPENDS-ON list. The INCLUDED list of a version of a data item is a list of all of the committed transactions that have ever updated that version of the data item. The DEPENDS-ON list of a transaction is a list of every transaction on which the transaction depends. Initially, the DEPENDS-ON list of a transaction is empty. Every time a version of a data item is supplied to the transaction, all of the transactions in the INCLUDED list of the data item are added to the DEPENDS-ON list of the transaction.

Unfortunately, the volume of transactions in typical database systems renders the INCLUDED list and DEPENDS-ON list technique impractical. For example, over the life of a database, a particular data item may be updated by millions of transactions. Entries for each of these millions of transactions would have to be added to the DEPENDS-ON list of every transaction that accessed the data item. The DEPENDS-ON list of transactions that access many such data items could include trillions of entries. The overhead involved in the maintenance and manipulation of such lists would quickly exhaust the resources available to the database system.

Based on the foregoing, it is clearly desirable to provide a mechanism for tracking the dependencies between transactions. It is further desirable to provide a dependency tracking mechanism that consumes relatively low overhead and allows a database system to make a quickly determine whether one transaction depends on another. It is acceptable if the dependency determination mechanism occasionally indicates that there is a dependency when no dependency exists, but it is not acceptable for the mechanism to indicate that there is no dependency when a dependency actually exists.

SUMMARY OF THE INVENTION

A method and apparatus for tracking dependencies between transactions is provided. According to the method, the database system stores, for each data item, a list that identifies all of the transactions that have updated the data item. According to one embodiment, the head of the list has a fixed size and is stored on the same data block as the data item. The tail of the list is stored separate from the data item.

A depends-on time is maintained for each active transaction. Initially, the depends-on time is set to a value that indicates that the transaction associated with the depends-on time does not yet depend on any other transactions.

When a version of a data item is supplied to an active transaction, the database system determines a time value associated with the version of the data item based on the data that is stored with the data item. The time value represents a time that is at least as recent as the commit time of the committed transaction that most recently updated the version of the data item that is supplied to the active transaction. This time value may be determined, for example, by identifying the most recent commit time of the transactions identified in the list head associated with the data item.

In response to supplying the version of the data item to the active transaction, the depends-on time associated with the active transaction is updated to the time value associated with the version of the data item if the time value represents a time that is more recent than the current depends-on time of the active transaction. Using these techniques, the depends-on time associated with a transaction will always reflect a time that is at least as recent as the commit time of the most recently committed transaction on which the transaction depends. Consequently, the database system can determine that an active transaction does not depend on any given committed transaction simply by comparing the depends-on time of the active transaction with the commit time of the committed transaction. For example, if the depends-on time of a transaction TXA is less than the commit time of a transaction TXB, then TXA does not depend on TXB.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for tracking the dependencies between transactions in a database system are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
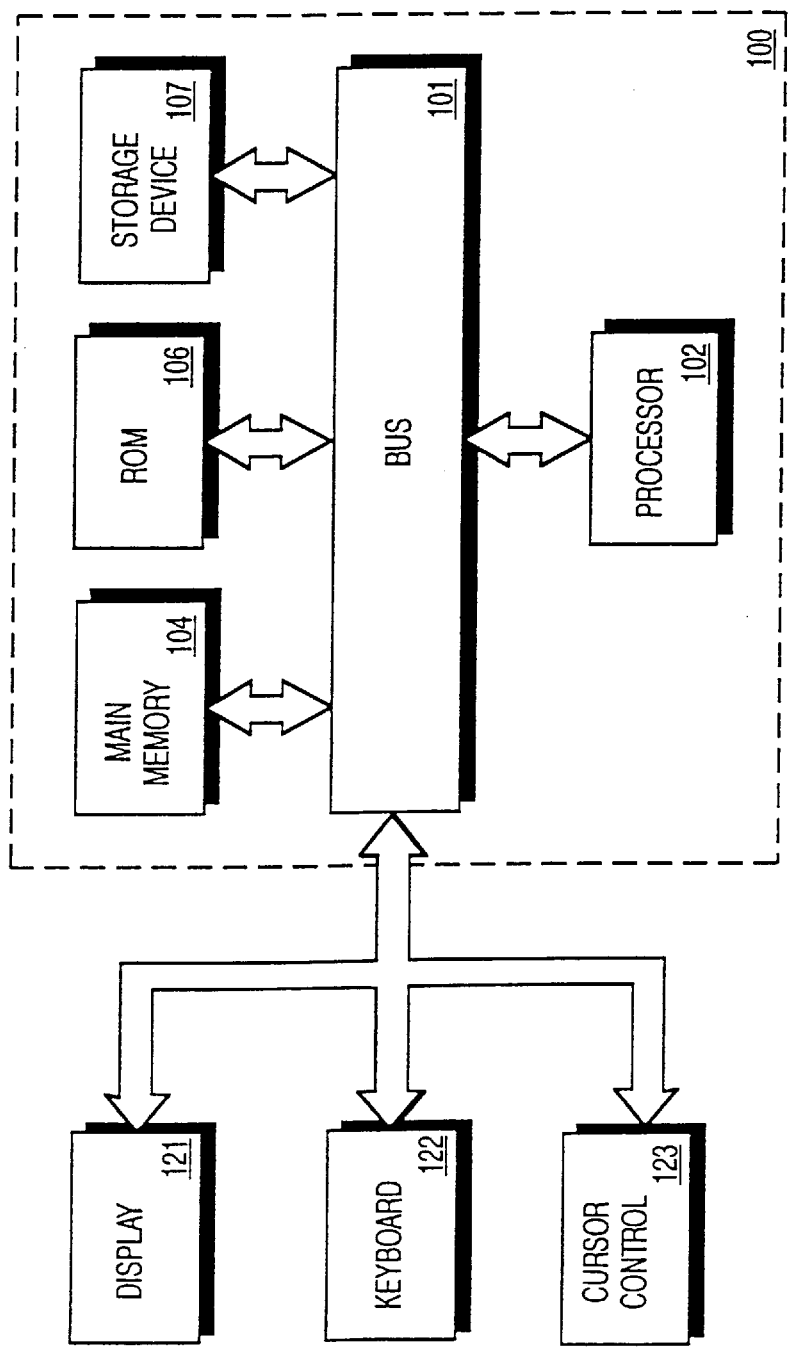
FIG. 1 is a block diagram of a computer system that may be used to implement the present invention.

Referring to FIG. 1, the computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to track the dependencies between the transactions that access a database. According to one embodiment, computer system 100 tracks transaction dependencies in response to processor 102 executing sequences of instructions contained in memory 104. Execution of the sequences of instructions contained in memory 104 causes processor 102 to perform the steps that will be described hereafter. In alternative embodiments, hard-wired circuitry may be used in place of or in combination with software instructions to implement the present invention. Thus, the present invention is not limited to any specific combination of hardware circuitry and software.

INCLUDED LIST MAINTENANCE

According to one embodiment of the invention, the database system stores for each data item an INCLUDED list that identifies every transaction that has ever modified the data item. Each entry in the INCLUDED list includes (1) data that identifies a transaction (a "transaction ID"), (2) the status of the transaction, and (3) the commit time of committed transactions. The status of a transaction will typically be "active" if the transaction has not yet been recorded as committed, and "committed" if the transaction has committed and that fact has been recorded.

As mentioned above, the number of transactions that update a data item may be significant. Therefore, according to one embodiment of the invention, only a fixed size head of the INCLUDED list is maintained with the data item. The remainder of the list (the "tail") is stored separate from the data item. According to one embodiment, the head of the list is stored on the same storage block as the data. Consequently, any process that reads the data will be aware of the information contained in the list head without having to perform any additional read operations.

The INCLUDED list is maintained in a manner that ensures that the list head contains an entry for every currently active transaction that modified the data item. Any remaining space in the list head is filled with entries of the most recently committed transactions.

Various techniques may be used to ensure that the list head contains an entry for every currently active transaction that modified the data item. The list may be maintained, for example, by always writing the entry for the most recent transaction to modify the data item into the list head. When the list head does not have unused space for new entries, data from the oldest committed entry in the list head is stored in the list tail and the new entry is written over the oldest entry in the list head.

Figure 2:
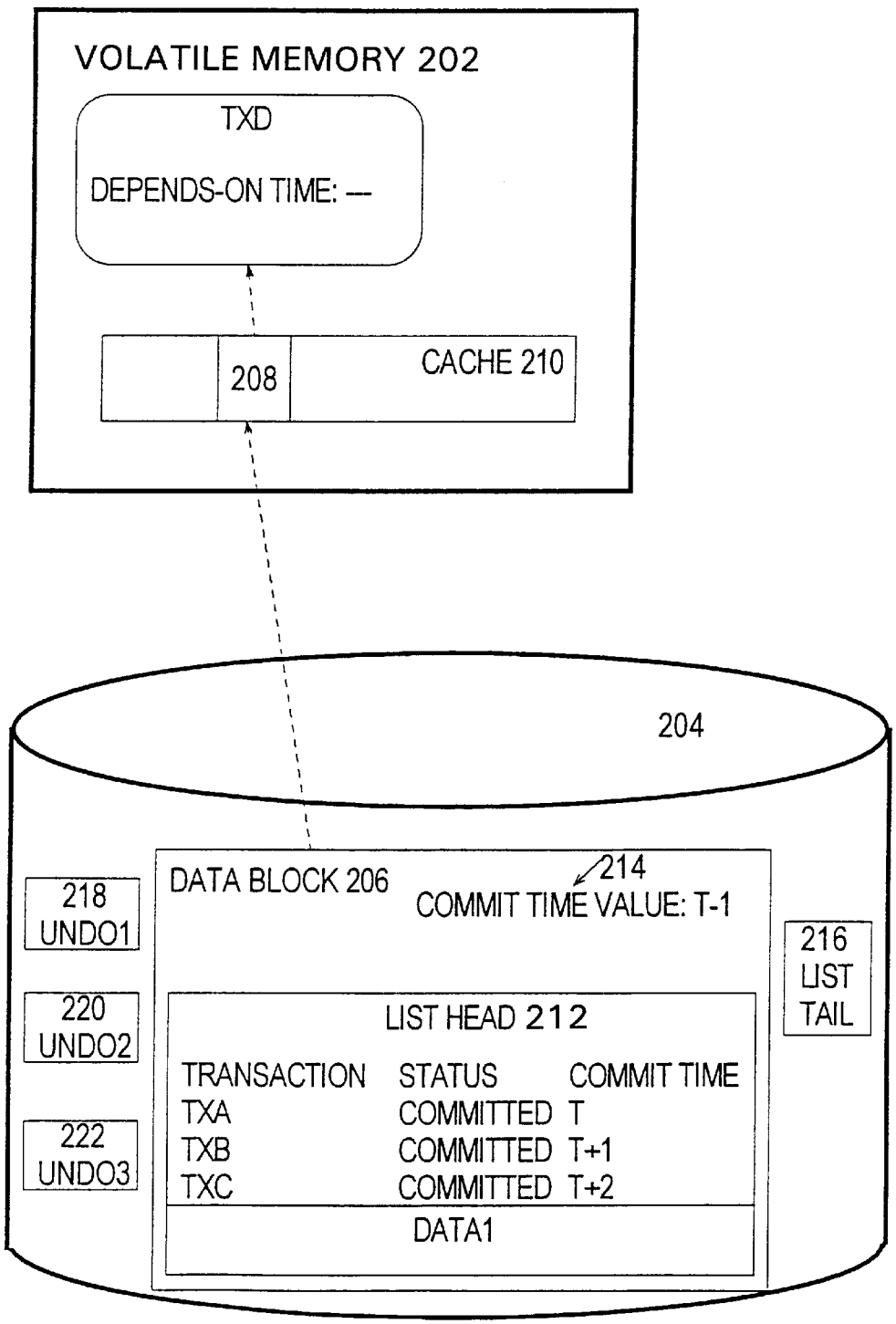
FIG. 2 is a block diagram of a database system in which transaction dependencies are tracked using depends-on time according to an embodiment of the invention.

FIG. 2 is a block diagram illustrating a database system in which the list head of an INCLUDED list is maintained on the same data block as the data item itself, while the list tail is maintained separate from the data item. Referring to the database system 200 of FIG. 2, it includes volatile memory 202 and non-volatile memory 204. Non-volatile memory 204 generally represents one or more storage devices, such as magnetic or optical drives, on which a database is stored. In the illustrated example, a data block 206 containing a data item DATA 1 is stored on storage device 204. Also stored on data block 206 is the list head 212 of the INCLUDED list for DATA 1. The list tail 216 for DATA 1 is stored on storage 204 separate from data block 206. In the illustrated example, list head 212 contains entries for three transactions, TXA, TXB and TXC. The entries in list head 212 indicate that transactions TXA, TXB and TXC committed at times T, T+1 and T+2, respectively. When transaction TXA updated DATA 1, the entry for TXA was written into list head 212, and undo record 218 was generated. Undo record 218 includes data that indicates how to remove from data block 206 all changes made by transaction TXA to data block 206, including changes made to the data itself, changes made to list head 212, and changes made to a commit time value 214. The use of commit time value 214 shall be described in greater detail below. Similarly, undo records 220 and 222 were generated when transactions TXB and TXC updated data block 206. Undo records 220 and 222 respectively contain data that indicates how to undo the changes made to data block 206 by transactions TXB and TXC.

When transaction TXD requires access to data block 206, a copy of data block 206 is loaded into a buffer 208 in cache 210. The transaction TXD then accesses the copy of data block 206 that is stored in the buffer 208. As shall be explained in greater detail below, the database system 200 may reconstruct an earlier version of data block 206 to load into buffer 208 by applying one or more of undo records 218, 220 and 222.

INCLUDED LIST SEARCHING

It is impractical to search through an entire INCLUDED list to determine whether a particular transaction updated a data item. According to one embodiment of the invention, the need to search through vast INCLUDED lists to determine whether a particular transaction belongs to the INCLUDED lists is avoided by assuming that the INCLUDED list of a data item includes all transactions that committed before the most recently committed transaction that updated the data item. Using this assumption, the INCLUDED list of a data item may be represented by a single value, referred to herein as an "include-time". The include-time of a version of a data item is the commit time of the most recently committed transaction whose updates are reflected in the version of the data item.

For example, assume that a version 1 of data item X was updated by transactions TXA, TXB and TXC. TXA committed at time T, TXB committed at time T+1, and TXC committed at time T+2. Under these circumstances, T+2 is the "include-time" of version 1 of data item X. Based on the assumption set forth above, all transactions that committed at or before time T+2 are considered to be in the INCLUDED list of version 1 of data item X.

Assume that a version 2 of data item X is constructed, where the update made by TXC has been removed. Under these circumstances, TXB is the most recently committed transaction whose updates are reflected in version 2 of data item X. Consequently, the "include-time" of version 2 of data item X would be T+1. All transactions that committed before T+1 would be members of the INCLUDED list of version 2 of data item X. TXC would be a member of the INCLUDED list for version 1, but not for version 2.

By using the "include-time" of a version, a database system may determine whether a given transaction is a member of the INCLUDED list represented by the include-time by comparing the include-time of the data item to the commit time of the transaction. Specifically, if the commit time of a transaction is less than or equal to an include time, then the transaction is considered to be a member of the INCLUDED list represented by the include time. Conversely, if the commit time of a transaction is greater than an include time, then the transaction is considered not to be a member of the INCLUDED list represented by the include time.

According to one embodiment, the database system determines the include-time of a data item by inspecting the head of the INCLUDE list. As mentioned above, the head of the include list will contain entries for the transactions that most recently updated the data item. The include-time of the INCLUDE list may therefore simply be determined by identifying the most recent commit time specified in the entries in the head of the INCLUDE list.

COARSE GRANULARITY DATA BLOCK

In some database systems, write locks may have a finer granularity than data blocks. That is, a single data block may contain multiple data items, where each data item is a separate resource upon which transactions may obtain locks. For example, assume that data block 206 included three data items, DATA 1, DATA 2 and DATA 3. A write lock for each of the data items may simultaneously be held by separate active transactions.

Consequently, it is possible that all of the entries in list head 212 are for active transactions. As shall be explained hereafter, commit time value 214 stores a time value that is at least as recent as the commit times of the transactions identified in list tail 216. Consequently, commit time value 214 may be used as the include-time value for data block 206 when all of the entries in list head 212 are for active transactions.

ACTIVE-ONLY LIST HEADS

As explained above, it is possible that all of the transactions identified in a list head are active, and therefore have no commit times. Under these conditions, the include-time for the INCLUDE list cannot be determined by the information contained in the entries in the list head.

When the include-time for an INCLUDE list cannot be determined by the information contained in the entries in the list head, other information must be inspected to determine the include-time. For example, entries from the list tail can be read to determine the commit time of the most recently committed transaction to update a given data item. However, if the list tail is not chronologically sorted, this approach would consume a significant amount of resources. Even if the list tail is chronologically sorted, accessing the list tail would involve at least one read operation in addition to reading the block on which the data is contained.

According to one embodiment of the invention, the problem associated with a list head that contains only active transactions is avoided by maintaining a special commit time value on the storage block that stores the data. The commit time value stored in the data block with a data item must be at least as high as the highest commit time of the transactions represented in the list tail of the data item. If all of the entries in the list head are for active transactions, then the dependent time of a transaction that accesses the data item is set to the maximum of the current dependent time and the commit time value stored in the data block.

Various techniques may be used to maintain the commit time value in the data block. For example, every time a new entry is written into the list head over an existing entry, the database system determines whether the entry that is being overwritten belongs to a committed transaction. If the overwritten entry belongs to a committed transaction, then the commit time of the overwritten entry is stored as the commit time value.

In an alternative embodiment, the database system determines whether the overwritten entry belonged to the only committed transaction represented in the list head. If the overwritten entry belonged to the only committed transaction represented in the list head, the commit time specified in the overwritten entry is stored as the commit time value for the data block. Otherwise, the commit time value in the data block is not changed.

DEPENDS-ON LIST APPROXIMATION MECHANISM

Similar to INCLUDED lists, DEPENDS-ON lists may include millions of transactions. According to one embodiment of the invention, a DEPENDS-ON list is represented by a depends-on time. All transactions that committed at or before a depends-on time are considered to be in the DEPENDS-ON list represented by the depends-on time. Consequently, a transaction must see all changes made by all transactions that committed at or before the depends-on time associated with the transaction.

When a version of a data item is supplied to a transaction, all of the members of the INCLUDED list associated with the version are added to the DEPENDS-ON list of the transaction. In an embodiment that uses include times and depends-on times, this is performed by setting the depends-on time associated with the transaction to the include time associated with the version supplied to the transaction when the included time is greater (later) than the depends-on time. That is, NMST=MAX(OMST, IC), where NMST is the new depends-on time of the transaction, OMST is the old depends-on time of the transaction, and IC is the include time of the version of data that is supplied to the transaction.

By maintaining a depends-on time for each transaction, a database system may determine whether a given transaction is a member of the DEPENDS-ON list represented by the depends-on time by comparing the depends-on time to the commit time of the transaction. Specifically, if the commit time of a transaction is less than or equal to a depends-on time, then the transaction is a member of the DEPENDS-ON list represented by the depends-on time. Conversely, if the commit time of a transaction is greater than a depends-on time, then the transaction is not a member of the DEPENDS-ON list represented by the depends-on time.

A transaction cannot be supplied a particular version of a data item if any member of its DEPENDS-ON list has made changes that were removed from the particular version of the data item. In an embodiment that uses depends-on times to represent DEPENDS-ON lists, the database system may make this determination simply by determining whether any transaction whose changes have been removed from a version of a data item committed before the depends-on time of the transaction.

Figure 3:
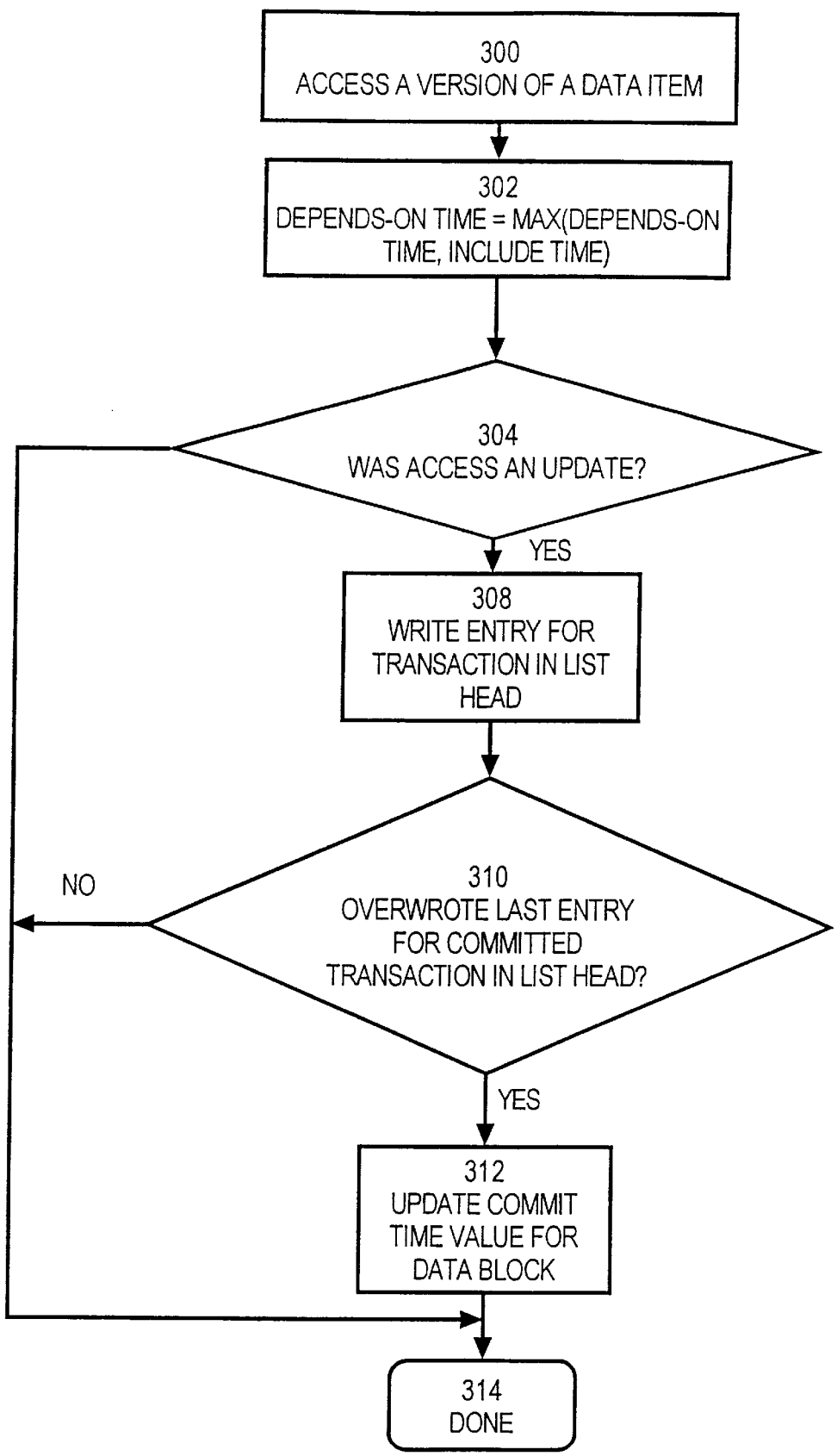
FIG. 3 is a flow chart illustrating steps performed in response to an active transaction accessing a version of a data item according to an embodiment of the invention.

FIG. 3 is a flow chart illustrating steps performed by a database system when a transaction accesses a version of a data item. Referring to FIG. 3, at step 300, a version of the data item is supplied to the transaction. At step 302, the depends-on time of the transaction is set to the greater of the current depends-on time of the transaction and the include time of the version of the data block that was supplied to the transaction.

At step 304, it is determined whether the transaction updated the data item. If the transaction updated the data item, control proceeds to step 308. Otherwise, control proceeds to step 314.

At step 308, an entry for the transaction is entered into the list head of the data block. At step 310, it is determined whether the entry that was inserted into the list head overwrote the last entry for a committed transaction that was in the list head. Thus, if all but one of the entries in the list head of the data block were for active transactions, and at step 308 the entry was written over the only entry for a transaction that was not active, control proceeds to step 312. Otherwise, control proceeds to step 314.

At step 312 the commit time value for the data block is updated with the commit time value of the entry that was overwritten. Because the commit time value of the overwritten entry will be more recent than the commit time values of any transactions identified in the list tail for the data item, the commit time value will always indicate a time that is at least as recent as the commit time of the most recently committed transaction in the list tail. At step 314, the process is done.

SNAPSHOTS

In some database systems, snapshot times are used to ensure that transactions see a consistent view of the database. In such systems, all reading done by a transaction is done as of a snapshot time. Changes made by all transactions that committed before the snapshot time must be seen by the transaction, and no changes made by any transactions that committed after the snapshot time can be seen by the transaction (except for changes made by the transaction itself).

To provide the appropriate versions of data to transactions, such systems typically include a reconstruction mechanism that recreates previously-existing versions of data. For example, assume that a data item DATA1 was updated by transactions TXA, TXB and TXC which committed at times T, T+1 and T+2, respectively. If a transaction TXD with a snapshot time of T+1 reads DATA1, the reconstruction mechanism must remove the changes made by TXC before supplying DATA1 to TXD.

Typically, version reconstruction is performed by applying undo records that are generated at the time updates are made. For example, when TXA updated DATA1, TXA would have generated an undo record UNDO1 which, when applied, would remove the changes made by TXA to DATA1. Similarly, TXB and TXC would have generated undo records UND02 and UND03 that may be applied to undo their changes to DATA1. Thus, in the example given above, the reconstruction mechanism would apply UNDO3 before supplying DATA1 to TXD.

According to one embodiment, the undo records generated during an update operation include data to undo all changes made to the block on which the data resides. In addition to the changes made to the data itself, such changes also include changes made to the entries in the INCLUDED list head and the commit time value stored in the data block. For example, after UNDO3 is applied, the INCLUDED list head for DATA1 will no longer include an entry for TXC. Rather, the block will contain the data that was overwritten by the entry for TXC. That data will be an entry for a transaction that committed before TXA and TXB. Because the entry for TXC has been removed from the data block, TXB is the most recently committed transaction identified in the reconstructed list head. Consequently, the include time for the reconstructed version of DATA1 can accurately be determined to be T+1 based on the reconstructed version of the list head.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for tracking dependencies between transactions, the method comprising the steps of:

storing data that indicates which transactions have updated a data item, said data including commit times for those transactions that have committed after updating the data item;

storing a depends-on time associated with an active transaction;

accessing a version of the data item in response to executing said active transaction;

reading said data to determine a time value that represents a time that is at least as recent as a commit time of a committed transaction that most recently updated said version of the data item;

updating the depends-on time associated with the active transaction to said time value if said time value represents a time more recent than said depends-on time; and approximating a determination of whether said active transaction depends on another transaction based on a comparison between a commit time for said other transaction and the depends-on time associated with the active transaction.

2. The method of claim 1 wherein the step of storing data that indicates which transactions have updated a data item includes the steps of:

storing in a data block with said data item a list head that includes a fixed number of entries for transactions that updated said data item; and storing separate from said data item a list tail that includes additional entries for transactions that updated said data item.

3. The method of claim 2 wherein the step of reading data to determine a time value includes reading said data block without reading said list tail.

4. The method of claim 2 further comprising the steps of:

updating said data item in response to executing a second transaction;

writing over an entry in said list head in response to updating said data item, wherein said entry is the only entry in said list head for a committed transaction;

writing a include time value into the data block in response to writing over said entry, wherein said include time value represents a time that is at least as recent as the commit time of the transaction associated with said entry.

5. The method of claim 4 wherein, when all entries in said list head represent active transactions:

the step of reading said data to determine a time value includes reading said include time value; and the step of updating the depends-on time associated with the active transaction includes updating the depends-on time to said include time value.

6. A method for tracking dependencies between transactions, the method comprising the steps of:

when a version of a data item is supplied to a transaction, determining an include-time value that represents a time at least as recent as a commit time of a transaction that most recently updated said version of said data item;

resetting depends-on time value associated with said transaction to said include time value if said include time value represents a time that is more recent that said depends-on time value; and approximating a determination of whether said transaction depends on a committed transaction based on a comparison between a commit time for the committed transaction and the depends-on time of said transaction.

7. The method of claim 6 further comprising the steps of:

storing in a data block on a persistent storage device a stored version of said data item; and wherein the step of determining said include-time value includes determining said include-time value based on data stored on said data block.

8. The method of claim 7 further comprising the steps of:

storing on said data block a list head that indicates commit times of transactions that have updated said data block; and wherein the step of determining said include-time value based on data stored on said data block includes determining said include-time value based on said commit times of transactions that have updated said data block.

9. The method of claim 7 further comprising the steps of:

storing in said data block entries that identify a set of transactions that have updated said data block, said entries including commit times for any transaction in said set of transactions that is committed; and storing in said data block a commit time value specified in an entry of said entries when the entry is to be overwritten;

wherein the step of determining said include-time value includes determining said include-time value based on said commit time value.

10. The method of claim 9 wherein:

the method further comprises the step of determining whether the entry to be overwritten is the only entry of said entries associated with a committed transaction; and the step of storing in said data block a commit time value specified in an entry is performed in response to determining that the entry to be overwritten is the only entry of said entries associated with a committed transaction.

11. The method of claim 7 further comprising the steps of:

reconstructing said data block by applying one or more undo records to said data block;

wherein said version of said data item is the version of said data item in said reconstructed data block; and wherein the step of determining said include-time value includes determining said include-time value based on data stored in said reconstructed data block.

12. A computer readable medium having stored thereon sequences of instructions, said sequences of instructions including sequences of instructions which, when executed by a processor, cause the processor to perform the steps of:

when a version of a data item is supplied to a transaction, determining an include-time value that represents a time at least as recent as a commit time of a transaction that most recently updated said version of said data item;

resetting a depends-on time value associated with said transaction to said include time value if said include time value represents a time that is more recent that said depends-on time value; and approximating a determination of whether said transaction depends on a committed transaction based on a comparison between a commit time for the committed transaction and the depends-on time of said transaction.

13. The computer-readable medium of claim 12 further comprising sequences of instructions for performing the steps of:

storing in a data block on a persistent storage device a stored version of said data item; and wherein the step of determining said include-time value includes determining said include-time value based on data stored on said data block.

14. The computer-readable medium of claim 13 further comprising sequences of instructions for performing the steps of:

storing on said data block a list head that indicates commit times of transactions that have updated said data block; and wherein the step of determining said include-time value based on data stored on said data block includes determining said include-time value based on said commit times of transactions that have updated said data block.

15. The computer-readable medium of claim 13 further comprising sequences of instructions for performing the steps of:

storing in said data block entries that identify a set of transactions that have updated said data block, said entries including commit times for any transaction in said set of transactions that is committed; and storing in said data block a commit time value specified in an entry of said entries when the entry is to be overwritten;

wherein the step of determining said include-time value includes determining said include-time value based on said commit time value.

16. The computer-readable medium of claim 15 wherein:

the computer-readable medium further includes sequences of instructions for performing the step of determining whether the entry to be overwritten is the only entry of said entries associated with a committed transaction; and the step of storing in said data block a commit time value specified in an entry is performed in response to determining that the entry to be overwritten is the only entry of said entries associated with a committed transaction.

17. The computer-readable medium of claim 13 further comprising sequences of instructions for performing the steps of:

reconstructing said data block by applying one or more undo records to said data block;

wherein said version of said data item is the version of said data item in said reconstructed data block; and wherein the step of determining said include-time value includes determining said include-time value based on data stored in said reconstructed data block.

* * * * *